United States Patent
Hashimoto et al.

(10) Patent No.: US 6,927,507 B2
(45) Date of Patent: Aug. 9, 2005

(54) ELECTROMAGNETIC DEVICE

(75) Inventors: Naoya Hashimoto, Tokyo (JP); Teruo Miyaoku, Tokyo (JP); Shiro Hasegawa, Tokyo (JP); Chiaki Sugano, Tokyo (JP); Hiromasa Ozawa, Tokyo (JP); Hirohisa Ohta, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 301 days.

(21) Appl. No.: 09/961,187

(22) Filed: Sep. 24, 2001

(65) Prior Publication Data

US 2002/0050751 A1 May 2, 2002

(30) Foreign Application Priority Data

Oct. 30, 2000 (JP) ........................................ 2000-330750

(51) Int. Cl.$^7$ .............................................. H02K 15/12
(52) U.S. Cl. .............................. 310/45; 310/71; 310/43
(58) Field of Search ............................... 310/71, 45, 43

(56) References Cited

U.S. PATENT DOCUMENTS

| | | | |
|---|---|---|---|
| 4,138,604 A | | 2/1979 | Harmsen et al. |
| 5,111,175 A | | 5/1992 | Sugiura et al. |
| 5,121,017 A | * | 6/1992 | Yomomato ................... 310/49 |
| 5,153,550 A | | 10/1992 | Sugiura et al. |
| 5,497,936 A | | 3/1996 | Vojta et al. |
| 5,656,877 A | * | 8/1997 | Louber ........................ 310/13 |
| 5,658,660 A | * | 8/1997 | Teshima ...................... 428/334 |
| 6,407,472 B1 | * | 6/2002 | Takyanagi ................... 310/45 |
| 6,455,962 B2 | * | 9/2002 | Susuki ........................ 310/71 |
| 6,515,394 B2 | * | 2/2003 | Udeta ......................... 310/208 |

FOREIGN PATENT DOCUMENTS

| | | |
|---|---|---|
| EP | 0200014 | 11/1986 |
| JP | 57-170529 U | 4/1956 |
| JP | 63-161833 A | 7/1988 |
| JP | 02-81005 U | 6/1990 |
| JP | 5-276710 | 10/1993 |
| JP | 08-111969 A | 4/1996 |
| JP | 09-322456 A | 12/1997 |

OTHER PUBLICATIONS

Patent Abstracts of Japan, vol. 012, No. 486, Dec. 19, 1988.
Patent Abstracts of Japan, vol. 012, No. 060, Feb. 23, 1988.

* cited by examiner

Primary Examiner—Thomas M. Dougherty
Assistant Examiner—Iraj Mohandesi
(74) Attorney, Agent, or Firm—Sughrue Mion, PLLC

(57) ABSTRACT

A stepping motor being a motor used in oil includes a coil formed with a conductor coated with an outer coating and wound around a bobbin, and coil terminals electrically connected to the conductor at ends thereof led out from the coil, the outer coating being removed from the conductor at the ends thereof. The coil terminals are coated with a protective film made of a material having low permeability to elemental sulfur and sulfur compounds. Therefore, coil terminals and ends of the conductor are prevented from erosion by sulfur and organic sulfur compounds, thereby reducing risk of disconnection in the coil terminals and the conductor.

6 Claims, 8 Drawing Sheets

ELECTROMAGNETIC DEVICE

BACKGROUND OF THE INVENTION

1. Field of the Invention

The present invention relates to an electromagnetic device such as a motor or the like, for example, used in a transmission case containing oil.

2. Description of the Related Art

FIG. 4 is a plan view of the stepping motor 1. FIG. 5 is a sectional view of the stepping motor 1 shown in FIG. 4 along a line V—V. FIG. 6 is a sectional view of the stepping motor 1 shown in FIG. 5 along a line VI—VI. FIG. 7 is a sectional view of the stepping motor 1 shown in FIG. 5 along a line VII—VII. FIG. 8 is a perspective view of a critical portion of the stepping motor 1 shown in FIG. 4.

In the drawings, the permanent-magnet-type stepping motor 1, provided in a transmission case (not shown) containing oil, includes a resin casing 2, a resin cylindrical housing 12 connected with the casing 2, a motor body 3 received in the casing 2, a shaft 4 to be rotated by the motor body 3, and a converting structure for converting the rotational movement of the shaft 4 into linear movement. The casing 2 and the housing 12 form a cover.

The motor body 3 includes a stator 5 fixed to the casing 2, and a rotor 6 fixed to the shaft 4. The stator 5 includes a coil 7 having a conductor made of a copper wire covered with an insulative film which is wound in a plurality of turns, coil terminals 8 led out from the coil 7, connector terminals 9 connected to the coil terminals 8, and external terminals 25 connected to the connector terminals 9. The rotor 6 includes a bush 10 fixed to the shaft 4, and a hollow cylindrical permanent-magnet 11 fixed to the bush 10.

The housing 12 is fixed at a first end thereof to the casing 2 by a plurality of screws 12A extending parallel to the shaft 4. The casing 2 is provided with a circular mating hole 2a formed therein, and the housing 12 is provided with a mating member 12a so as to be inserted in the mating hole 2a. In FIG. 6, the mating member 12a is provided with three positioning-protrusions 12b at the outer periphery of the mating member 12a, the positioning protrusions 12b protruding in the radial directions and in contact with the inner periphery of the mating hole 2a. The housing 12 is provided with an annular groove 12c formed therein at a face in connection with the casing 2.

The housing 12 is provided therein with a housing through-hole 12d communicating between the outside and the inside of the housing 12, the housing through-hole 12d being provided at a side face of the housing 12. A filter 13 for capturing contamination of oil is provided in the housing through-hole 12d. The shaft 4 is rotatably supported by bearings 14 and 15. The bearing 15 affixed in the housing 15 is a rubber-seal-type bearing.

The housing 12 is provided, at a second end thereof opposite to the first end fixed to the casing 2, with a rod 16 which reciprocates along the axis of the shaft 4 with the rotation of the shaft 4. The rod 16 is inserted into the housing 12 at the base end of the rod 16, and the other end of the rod 16 protrudes from the second end of the housing 12. The rod 16 is provided therein with a through-hole 16a communicating between the inside of the housing 12 and the inside of the rod 16. The housing 12 is provided at the inner face of the second end thereof with a sleeve 17 for guiding the rod 16 linearly moving, an oil seal 18 for avoiding contamination to penetrate from the outer periphery of the rod 16, and an annular stopper 19 for restricting the linear movement of the rod 16.

The converting structure includes a threaded part 4a of the shaft 4, a resin guide member 20 disposed at the base end of the rod 16 and coupled with the threaded part 4a, and a metallic stopper 21 for restricting the linear movement of the rod 16 at the other side of the annular stopper 19. The guide member 20 and the stopper 21 include stopper faces 20b and 21a, respectively, perpendicular to the rotational axis of the shaft 4. In FIG. 7, the guide member 20 is provided with rotation-restricting protrusions 20a for restricting rotation of the rod 16 formed extending in the radial directions at the outer periphery of the guide member 20. With this arrangement, the guide member 20 is moved in the axial direction of the shaft 4 by the rotation thereof. The rod 16 is mounted with a resin member 22 to be coupled with the first link 30 at the end opposite to the base end of the rod 16.

In the stepping motor 1 having the above-described configuration, when electrical current is applied to the coil 7 via the connectors 25, a rotation-driving magnetic field is generated in the coil 7, thereby rotating the rotor 6 and the shaft 4 as a unit. The shaft 4 is coupled with the guide member 20 at the threaded part 4a of the shaft 4, and the rotational movement of the guide member 20 is restricted, whereby the rotational movement of the shaft 4 is converted into the linear movement of the guide member 20 and the rod 16.

By the linear movement of the rod 16 in both directions, the transmission control valve (not shown) is opened and closed, whereby the ratio of rotational speeds between the driving shaft and the engine shaft varies, as described above.

In a known stepping motor 1, tin-plated coil-terminals 8 made of copper and led out from a coil 7 are dipped in oil containing sulfur and organic sulfur compounds. Therefore, there has been a problem in that the plated tin is eroded by the sulfur and organic sulfur compounds, and a chemical reaction is generated between the copper material and the sulfur and organic sulfur compounds, whereby disconnection occurs.

In FIG. 9, the coil terminals 8 are electrically connected to a conductor 51 at ends 51 a thereof, at which an outer coating is removed so as to expose copper wires, by soldering by using a soldering material containing tin as a major component. There has also been a problem in that the soldered material is eroded at connected parts A by the sulfur and organic sulfur compounds, and a chemical reaction is generated between the copper material and the sulfur and organic sulfur compounds, whereby disconnection occurs.

SUMMARY OF THE INVENTION

The present invention aims to solve the above problems and an object of the present invention is to provide an electromagnetic device in which the resistance against disconnection in coil terminals and conductors is increased.

To this end, according to the present invention, there is provided an electromagnetic device used in oil, comprising: a coil including a conductor coated with an outer coating and wound around a bobbin; and a coil terminal electrically connected to the conductor at an end part thereof which is led out from the coil, the outer coating at the end part of the conductor being removed, at least one of the coil terminal and the end part is coated with a protective film, respectively, made of a material having low permeability to elemental sulfur and sulfur compounds.

According to another aspect of the present invention, there is provided an electromagnetic device used in oil, comprising: a coil including a conductor coated with an outer coating and wound around a bobbin; and a coil terminal electrically connected to the conductor at an end part thereof which is led out from the coil, the outer coating at said end part of the conductor being removed, wherein at least one of the coil terminal and the end part is coated with an overcoat made of a resin having low permeability to elemental sulfur and sulfur compounds.

DETAILED DESCRIPTION OF THE PREFERRED EMBODIMENTS

First Embodiment

Figure 1:
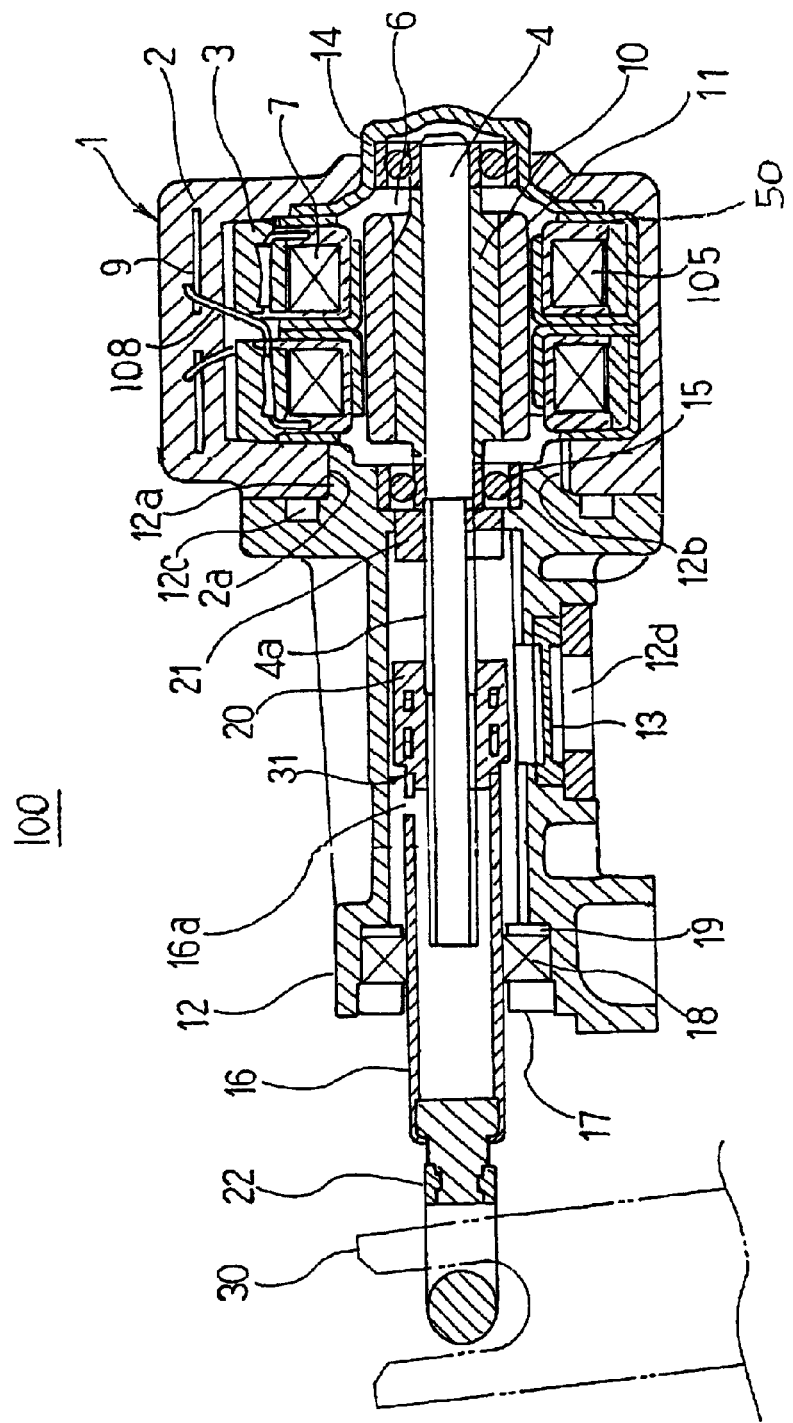
FIG. 1 is a sectional view of a stepping motor according to a first embodiment of the present invention.
Figure 2:
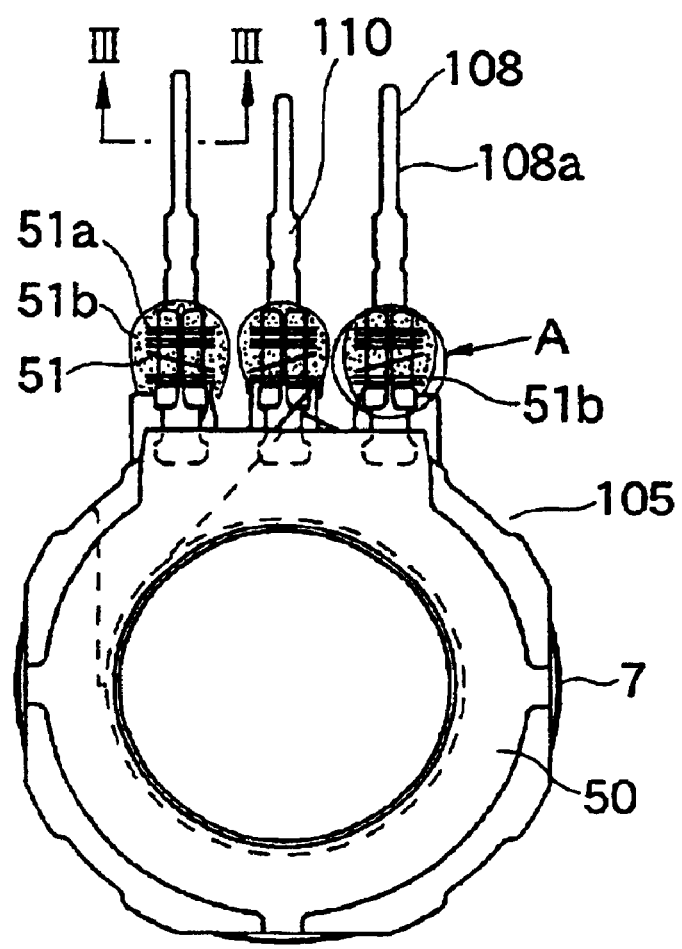
FIG. 2 is a front view of a stator shown in FIG. 1.
Figure 3:
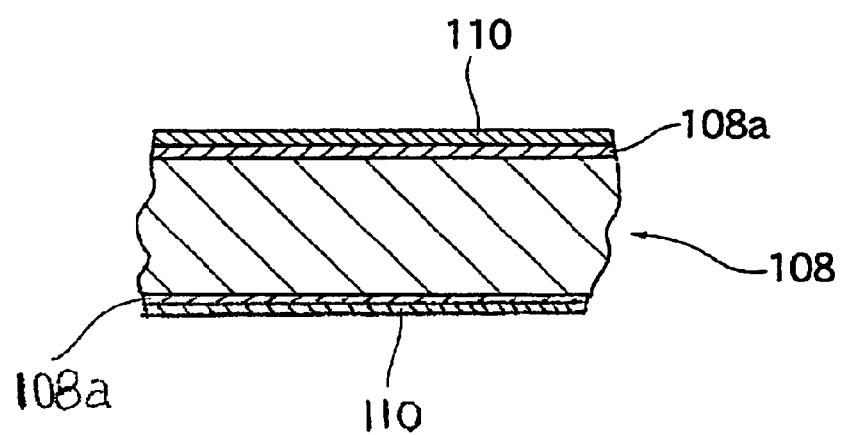
FIG. 3 is a sectional view of the stator shown in FIG. 2 along a line III—III.
Figure 4:
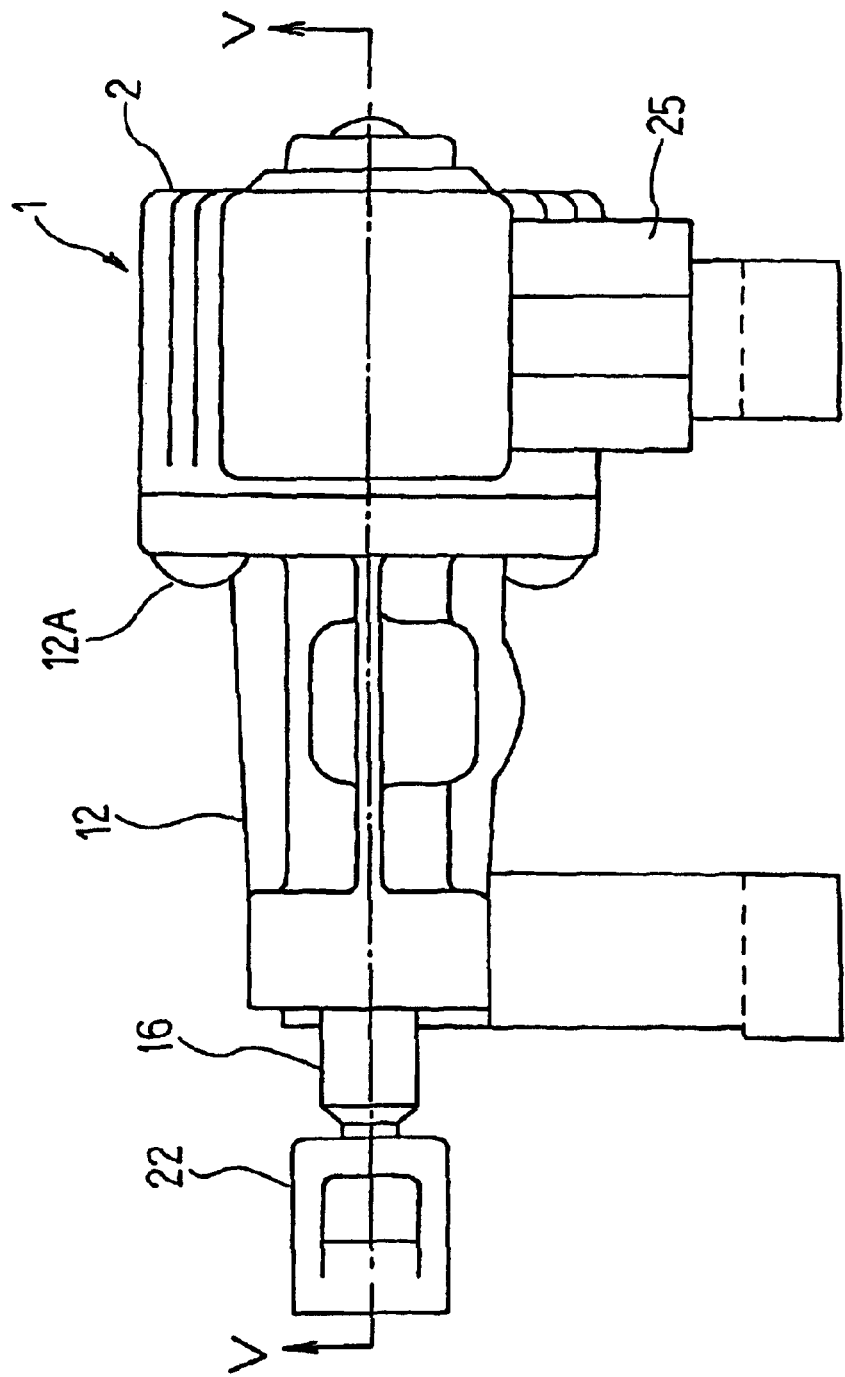
FIG. 4 is a plan view of a known stepping motor.
Figure 5:
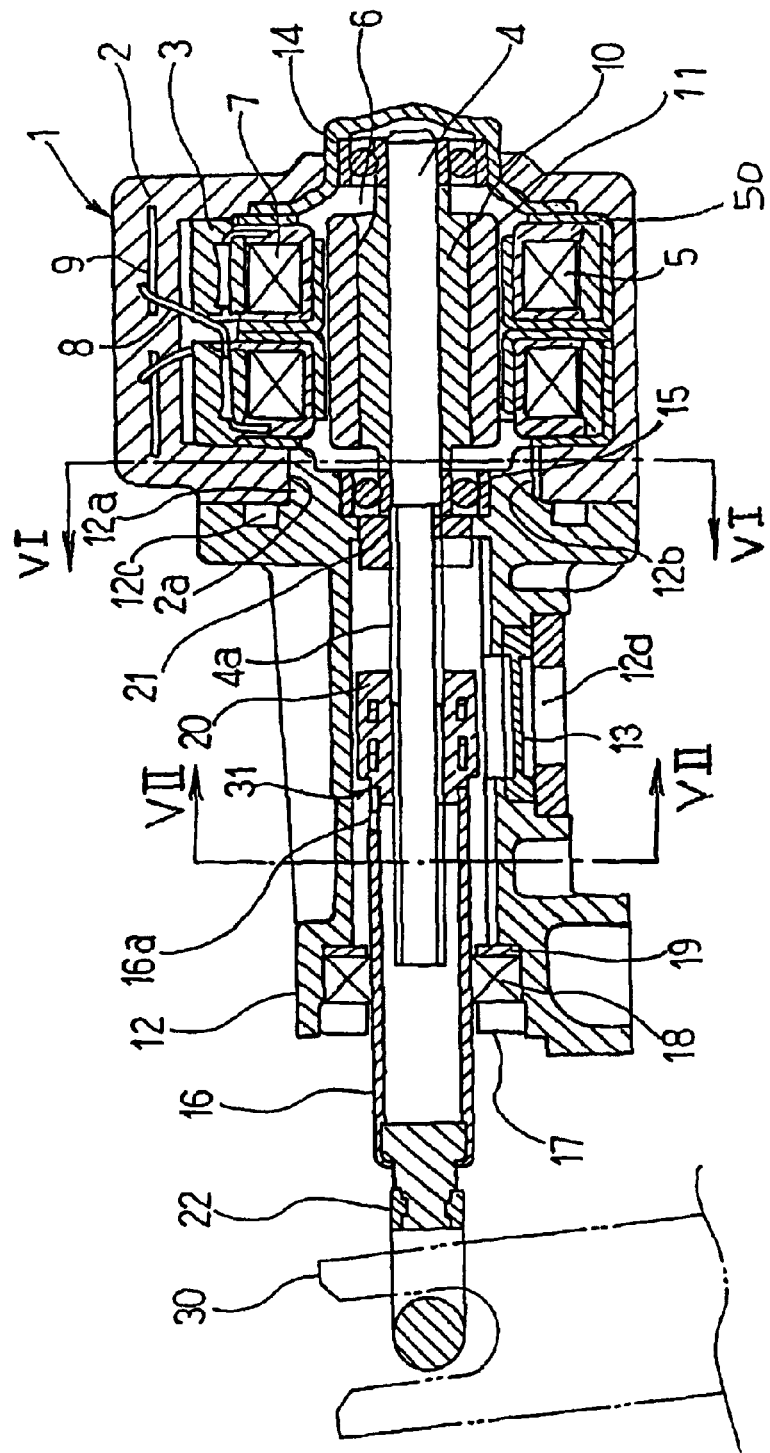
FIG. 5 is a sectional view of the known stepping motor shown in FIG. 4 along a line V—V.
Figure 6:
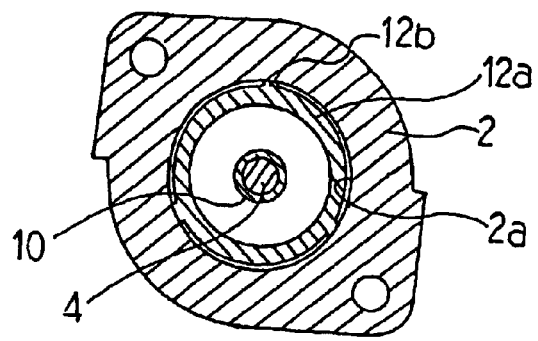
FIG. 6 is a sectional view of the known stepping motor shown in FIG. 5 along a line VI—VI.
Figure 7:
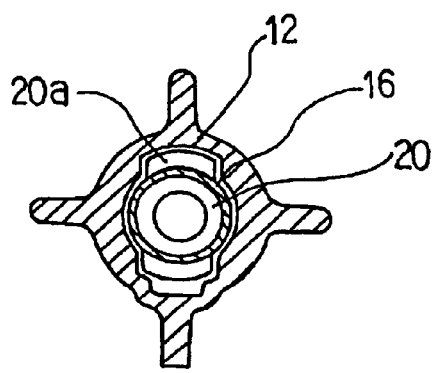
FIG. 7 is a sectional view of the known stepping motor shown in FIG. 5 along a line VII—VII.
Figure 8:
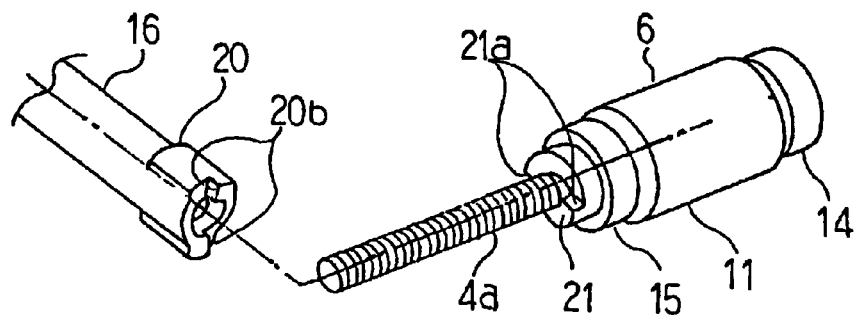
FIG. 8 is a perspective view of a critical portion of the known stepping motor shown in FIG. 4.
Figure 9:
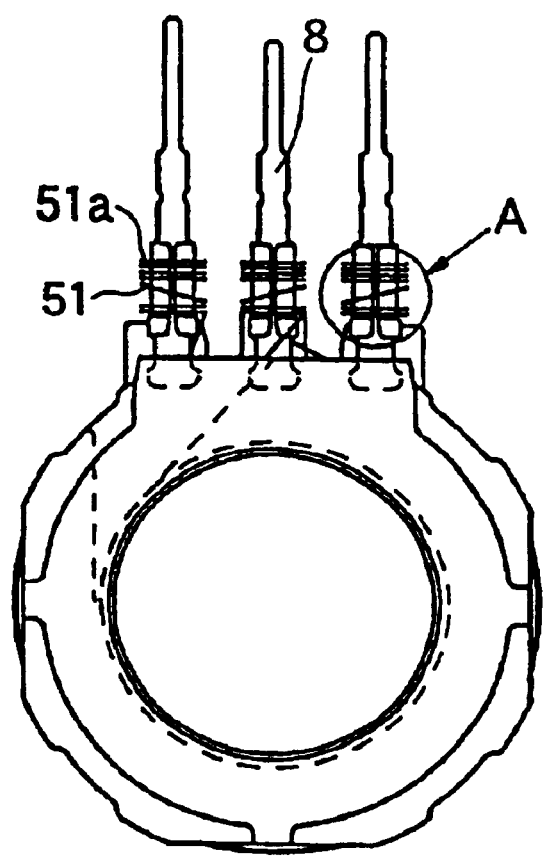
FIG. 9 is a front view of a stator shown in FIG. 5.

FIG. 1 is a sectional view of a stepping motor 100 which is an electromagnetic device according to a first embodiment of the present invention. FIG. 2 is a front view of a stator 105 included in the stepping motor 100 shown in FIG. 1. FIG. 3 is a sectional view of the stator 105 shown in FIG. 2 along a line III—III. Components the same as and corresponding to the known stepping motor shown in FIG. 5 are referred to with the same reference numerals, for which description is omitted.

According to the first embodiment, coil terminals 108 electrically connected to a conductor 51 at ends 51a thereof led from a coil 7 are coated thereon with a protective film 108a made of a material having low permeability to sulfur and sulfur compounds. The protective film 108a is formed by high-temperature soldering by using a lead-rich tin-lead alloy (lead of not less than 90% and the rest being tin) as a material for the protective film 108a, according to the first embodiment.

The coil terminals 108 are also coated, at connected parts A of the ends 51a of the conductor 51 at which copper wires are exposed by the outer coating being removed, with a protective film 51b having low permeability to sulfur and sulfur compounds. The protective film 51b is also formed by high-temperature soldering by using a lead-rich tin-lead alloy (lead of not less than 90% and the rest being tin) as a material for the protective film 51b.

An overcoat 110 overlies the protective films 108a and 51b, the overcoat 110 being made of a resin having low permeability to sulfur and sulfur compounds. The overcoat 110 includes a thermoset epoxy resin.

The overcoat 110 may be made of a thermosetting modified-phenol resin or a thermosetting modified-phenol resin including a rosin flux.

According to the embodiment, the coil terminals 108 are coated thereon with the protective film 108a made of a material having low permeability to sulfur and sulfur compounds, the protective film 108a being formed by high-temperature soldering, whereby the coil terminals 108 are prevented from erosion by sulfur and organic sulfur compounds, thereby reducing the risk of disconnection in the terminals 108.

The coil terminals 108 are also coated, at connected parts A of the ends 51a of the conductor 51 at which copper wires are exposed by the outer coating being removed, with the protective film 51b having low permeability to sulfur and sulfur compounds, the protective film 51b being formed by high-temperature soldering, whereby the ends 51a of the conductor 51 is prevented from erosion by sulfur and organic sulfur compounds, thereby reducing the risk of disconnection in the conductor 51.

The overcoat 110, which is made of a thermosetting epoxy resin having low permeability to sulfur and sulfur compounds, overlies the protective films 108a and 51b of the coil terminals 108 and the conductor 51, respectively, thereby further reducing the risk of disconnection in the coil terminals 108 and the conductor 51.

Figure 10:
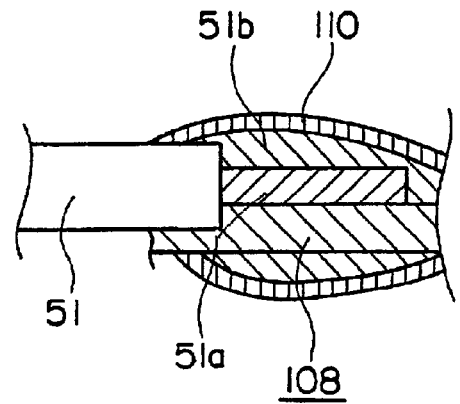
FIG. 10 is a sectional view of a connected part A shown in FIG. 2.

According to the embodiment, the ends 51a of the conductor 51 are coated with the double layers of the protective film 51b and the overcoat 110, as shown in FIG. 10.

Figure 11:
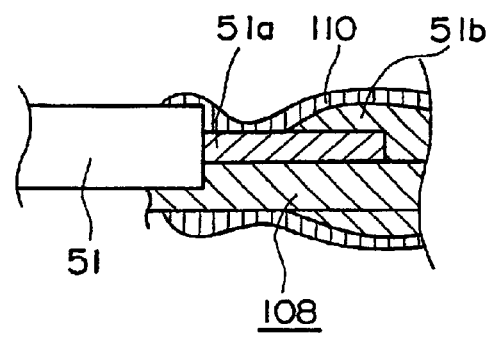
FIG. 11 is a sectional view of a critical portion of the stepping motor according to another embodiment of the present invention.
Figure 12:
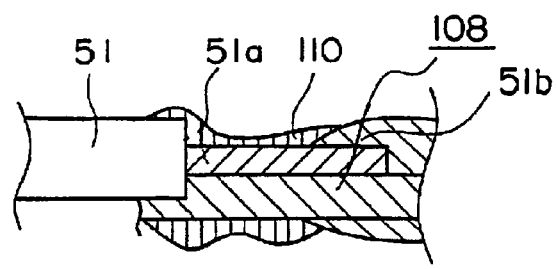
FIG. 12 is a sectional view of a critical portion of the stepping motor according to still another embodiment of the present invention.

The ends 51a of the conductor 51, from which the outer coating is removed, may be coated with the protective film 51b and the overcoat 110 respectively, and the coil terminals 108 may be coated with the protective film 51b and the overcoat 110 respectively, as shown in FIGS. 11 and 12.

Although a stepping motor is used as an electromagnetic device in the embodiment, the present invention is not limited to a stepping motor. The present invention may be applied to, for example, a transmission control valve (a solenoid valve) for controlling a transmission, in which oil flow or oil pressure is controlled by restricting oil paths by using movable valves which operate by an electromagnetic force generated by a coil, thereby varying the ratio of rotational speeds between a driving shaft and an engine shaft.

An alloy to be used for high-temperature soldering may include lead of not less than 60%.

As explained above, according to one aspect of the present invention, an electromagnetic device comprises: a coil including a conductor coated with an outer coating and wound around a bobbin; and a coil terminal electrically connected to said conductor at an end part thereof which is led out from said coil, the outer coating at the end part of the conductor being removed, at least one of the coil terminal and the end part is coated with a protective film, respectively, made of a material having low permeability to elemental sulfur and sulfur compounds. Therefore, the coil terminal and the end of the conductor are prevented from erosion by sulfur and organic sulfur compounds, thereby reducing risk of disconnection in the coil terminal and the conductor.

According to another aspect of the present invention, an electromagnetic device comprises: a coil including a conductor coated with an outer coating and wound around a bobbin; and a coil terminal electrically connected to the conductor at an end part thereof which is led out from the coil, the outer coating at the end part of the conductor being removed, wherein at least one of the coil terminal and the end part is coated with an overcoat made of a resin having low permeability to elemental sulfur and sulfur compounds. Therefore, the coil terminal and the end of the conductor are prevented from erosion by sulfur and organic sulfur compounds, thereby reducing risk of disconnection in the coil terminal and the conductor.

According to one form of the present invention, the protective film may be coated with a overcoat made of a resin having low permeability to elemental sulfur and sulfur compounds. Therefore, the risk of disconnection in the coil terminal and the conductor is further reduced.

According to another form of the present invention, the protective film may be composed of a high-temperature solder. Therefore, the risk of disconnection in the coil terminal and the conductor can be reduced at a low cost.

According to still another form of the present invention, the overcoat may comprise a thermoset epoxy resin. Therefore, the risk of disconnection in the coil terminal and the conductor can be reduced at a low cost.

According to still another form of the present invention, the overcoat may comprise a thermoset modified-phenol resin. Therefore, the risk of disconnection in the coil terminal and the conductor can be reduced at a low cost.

What is claimed is:

1. An electromagnetic device used in oil, comprising:

a coil including a conductor coated with an outer coating and wound around a bobbin; and a coil terminal electrically connected to said conductor at an end part thereof which is led out from said coil, the outer coating at said end part of said conductor being removed, wherein at least one of said coil terminal and said end part is coated with an overcoat made of a resin having low permeability to elemental sulfur and sulfur compounds.

2. The electromagnetic device according to claim 1, wherein said end part is coated with a protective film and said overcoat coats said protective film.

3. The electromagnetic device according to claim 2, wherein said protective film is composed of a high-temperature solder.

4. An electromagnetic device according to 1, wherein said overcoat comprises a thermoset epoxy resin.

5. An electromagnetic device according to claim 1, wherein said overcoat comprises a thermoset modified-phenol resin.

6. The electromagnetic device according to claim 1, wherein said overcoat also coats at least a protective film.

* * * * *